(12) United States Patent
Song et al.

(10) Patent No.: US 10,363,471 B2
(45) Date of Patent: Jul. 30, 2019

(54) METHOD AND DEVICE FOR MEASURING SPEED OF MOVING DEVICE

(71) Applicant: SHENZHEN COOLLANG CLOUD COMPUTING CO., LTD, Shenzhen (CN)

(72) Inventors: Zhicong Song, Shenzhen (CN); Hui Chen, Shenzhen (CN)

(73) Assignee: ShenZhen Coollang Cloud Computing Co., LTD, Shenzhen, Guangdong (CN)

( * ) Notice: Subject to any disclaimer, the term of this patent is extended or adjusted under 35 U.S.C. 154(b) by 159 days.

(21) Appl. No.: 15/262,549

(22) Filed: Sep. 12, 2016

(65) Prior Publication Data

US 2017/0291080 A1 Oct. 12, 2017

(30) Foreign Application Priority Data

Apr. 11, 2016 (CN) .......................... 2016 1 0223230

(51) Int. Cl.
*A63B 60/46* (2015.01)
*A63B 24/00* (2006.01)
(Continued)

(52) U.S. Cl.
CPC .......... *A63B 60/46* (2015.10); *A63B 24/0003* (2013.01); *A63B 24/0006* (2013.01);
(Continued)

(58) Field of Classification Search
CPC .................................................... A63B 60/46
See application file for complete search history.

(56) References Cited

U.S. PATENT DOCUMENTS 5,694,340 A * 12/1997 Kim .................... A63B 24/0006
434/252
2006/0166737 A1 7/2006 Bentley
(Continued)

FOREIGN PATENT DOCUMENTS

CN 102706301 A 10/2012
CN 103591925 A 2/2014
(Continued)

OTHER PUBLICATIONS

PCT publication with ISR issued by WIPO dated Oct. 19, 2017.
Chinese 1OA issued by SIPO dated Jul. 18, 2017.
Chinese 2OA issued by SIPO dated Jan. 17, 2018.

*Primary Examiner* — Herbert K Roberts
(74) *Attorney, Agent, or Firm* — Yunling Ren

(57) ABSTRACT

The present disclosure relates to a method for measuring a speed of a sports device. The method includes: acquiring movement data of the sports device during a process of tracking the sports device, the movement data being collected by a sensor disposed at a bottom of the sports device; calculating a linear speed and a rotational speed of the sports device based on accelerations of three axes in the movement data; and combining the linear speed and the rotational speed to obtain a movement speed of the sports device. In addition, the present disclosure also provides an apparatus for measuring a speed of a sports device, which corresponds to the above method. The method and the apparatus for measuring a speed of a sports device can improve the credibility of the speed measurement of the sports device.

6 Claims, 11 Drawing Sheets

(51) Int. Cl.
*A63B 60/06* (2015.01)
*A63B 102/04* (2015.01)

(52) U.S. Cl.
CPC .......... *A63B 60/06* (2015.10); *A63B 2102/04* (2015.10); *A63B 2220/30* (2013.01); *A63B 2220/40* (2013.01)

(56) References Cited

U.S. PATENT DOCUMENTS

2012/0277018 A1* 11/2012 Boyd ................. A63B 24/0003
  473/224
2013/0127866 A1* 5/2013 Yamamoto ............ G06T 11/206
  345/440

FOREIGN PATENT DOCUMENTS

| | | |
|---|---|---|
| CN | 103721393 A | 4/2014 |
| CN | 104225891 A | 12/2014 |
| CN | 105214296 A | 1/2016 |
| CN | 205084344 U | 3/2016 |
| CN | 105664454 A | 6/2016 |
| JP | 2009125499 A | 6/2009 |
| JP | 2015008881 A | 1/2015 |
| WO | 2011003218 A1 | 1/2011 |

\* cited by examiner

METHOD AND DEVICE FOR MEASURING SPEED OF MOVING DEVICE

CROSS REFERENCE

This application is based upon and claims priority to Chinese Patent Application No. 201610223230.3, filed on Apr. 11, 2016, the entire contents thereof are incorporated herein by reference.

TECHNICAL FIELD

The present disclosure generally relates to the field of interaction application technology, and more particularly, to a method and an apparatus for measuring a speed of a sports device.

BACKGROUND

With the development of various types of intelligent sports devices, more and more sports devices are equipped with intelligent apparatus to perform intelligent tracking of the sports devices, for example, sensing speed change of a sports device when the sports device is in a moving state, and in turn, measuring a speed of the sports device.

It is known a method for measuring a speed of a sports device is calculating a linear speed of the sports device as a ratio of a moving distance to a time period by means of a stopwatch.

Specifically, firstly a moving distance is acquired, then a time period is measured by the stopwatch, and finally a speed is calculated. However, in this method, if the stopwatch has a significant error, the speed measured for the sports device will be disadvantageous of a low credibility.

SUMMARY

In view of the above, there is a demand for a method for measuring a speed of a sports device, which can improve the credibility of the speed measurement of the sports device.

In addition, there is a demand for an apparatus for measuring a speed of a sports device, which can improve the credibility of the speed measurement of the sports device.

In order to solve the above problems, the technical solutions are provided as follows.

A method for measuring a speed of a sports device, including:

acquiring movement data of the sports device during a process of tracking the sports device, the movement data being collected by a sensor disposed at a bottom of the sports device;

calculating a linear speed and a tangential speed of rotational movement of the sports device based on accelerations of three axes in the movement data; and combining the linear speed and the tangential speed of the rotational movement to obtain a movement speed of the sports device.

In one embodiment, before the step of acquiring movement data of the sports device during a process of tracking the sports device, the method further includes:

collecting movement data by the sensor disposed at the bottom of the sports device; and transmitting the collected movement data wirelessly to a terminal for tracking the sports device.

In one embodiment, before the step of a calculating a linear speed and a tangential speed of the rotational movement of the sports device based on accelerations of three axes in the movement data, the method further includes:

filtering the movement data to remove noise in the movement data.

In one embodiment, the step of calculating a linear speed and a tangential speed of the rotational movement of the sports device based on accelerations of three axes in the movement data includes:

respectively calculating a speed related to linear movement and a speed related to the rotational movement from the accelerations of the three axes in the movement data, to obtain a speed related to the linear movement and the tangential speed of the rotational movement; and integrating the speed related to the linear movement over time to obtain the linear speed of the sports device.

In one embodiment, the sports device is a badminton racket, and the step of respectively calculating a speed related to linear movement and a speed related to rotational movement from the accelerations of the three axes in the movement data, to obtain a speed related to the linear movement and the tangential speed of the rotational movement, includes:

obtaining an acceleration of a Z axis of the badminton racket in a three-dimensional space from the accelerations of the three axes in the movement data, and calculating the tangential speed of the rotational movement of the badminton racket from the acceleration of the Z axis; and obtaining an acceleration of a X axis and an acceleration of a Y axis of the badminton racket in the three-dimensional space from the accelerations of the three axes in the movement data, and calculating the speed related to the linear movement of the badminton racket from the acceleration of the X axis and the acceleration of the Y axis.

An apparatus for measuring a speed of a sports device, including:

an acquiring module configured to acquire movement data of the sports device during a process of tracking the sports device, the movement data being collected by a sensor disposed at a bottom of the sports device;

a calculation module configured to calculate a linear speed and a tangential speed of the rotational movement of the sports device based on accelerations of three axes in the movement data; and a combining module configured to combine the linear speed and the tangential speed of the rotational movement to obtain a movement speed of the sports device.

In one embodiment, the apparatus further includes:

a sensor disposed at the bottom of the sports device and configured to collect movement data; and a transmission module configured to transmit the collected movement data wirelessly to a terminal for tracking sports devices.

In one embodiment, the apparatus further includes:

a filtering module configured to filter the movement data to remove noise in the movement data.

In one embodiment, the calculation module includes:

a speed calculation unit configured to respectively calculate a speed related to linear movement and a speed related to rotational movement from the accelerations of the three axes in the movement data, to obtain a speed related to the linear movement and the tangential speed of the rotational movement; and an integration unit configured to integrate the speed related to the linear movement over time to obtain the linear speed of the sports device.

In one embodiment, the sports device is a badminton racket, and the speed calculation unit includes:

a rotational calculation sub-unit configured to obtain an acceleration of a Z axis of the badminton racket in a three-dimensional space from the accelerations of the three axes in the movement data, and calculate the tangential speed of the rotational movement of the badminton racket from the acceleration of the Z axis; and a linear calculation sub-unit configured to obtain an acceleration of a X axis and an acceleration of a Y axis of the badminton racket in the three-dimensional space from the accelerations of the three axes in the movement data, and calculate the speed related to the linear movement of the badminton racket from the acceleration of the X axis and the acceleration of the Y axis.

The present disclosure also provides a system for measuring a speed of a sports device, including: a sensor disposed at a bottom of the sports device, a processor, and a memory for storing instructions executable by the processor;

wherein the processor is configured to:

acquiring movement data of the sports device during a process of tracking the sports device, the movement data being collected by the sensor disposed at a bottom of the sports device;

calculating a linear speed and a tangential speed of the rotational movement of the sports device based on accelerations of three axes in the movement data; and combining the linear speed and the tangential speed of the rotational movement to obtain a movement speed of the sports device.

The present disclosure also provides a non-transitory computer-readable storage medium storing instructions, executable by a processor in an apparatus, for performing a method for measuring a speed of a sports device, the method includes:

acquiring movement data of the sports device during a process of tracking the sports device, the movement data being collected by a sensor disposed at a bottom of the sports device;

calculating a linear speed and a tangential speed of the rotational movement of the sports device based on accelerations of three axes in the movement data; and combining the linear speed and the tangential speed of the rotational movement to obtain a movement speed of the sports device.

In the above technical solutions, movement data of the sports device is acquired during a process of tracking the sports device, the movement data being collected by a sensor disposed at the bottom of the sports device; a linear speed and a tangential speed of the rotational movement of the sports device are calculated based on accelerations of three axes in the movement data; and the linear speed and the tangential speed of the rotational movement are combined to obtain a movement speed of the sports device. In this way, the speed measurement of the sports device takes both of the linear speed and the tangential speed of the rotational movement of the sports device. Therefore, the accuracy can be improved, and the credibility of the speed measurement of the sports device can be correspondingly improved. It can enhance the intelligent tracking capability of the sports device.

DETAILED DESCRIPTION

Exemplary embodiments embodying the characteristics and advantages of the present disclosure will be described in detail below. It should be understood that embodiments of the present disclosure may be modified without departing the scope of the present disclosure. The description and drawings are merely for illustration, rather than limiting the present disclosure.

Figure 1:
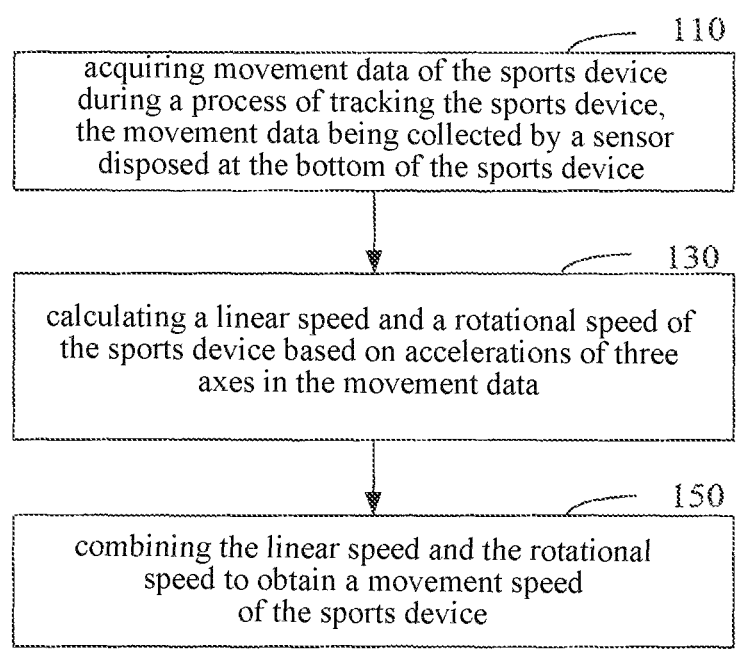
FIG. 1 is a flow chart illustrating a method for measuring a speed of a sports device according to an embodiment.

In one embodiment, in particular, the method for measuring a speed of a sports device, as shown in FIG. 1, includes the following steps.

At step 110, movement data of the sports device is acquired during a process of tracking the sports device, the movement data being collected by a sensor disposed at the bottom of the sports device.

The sports device may be a sports device used by a user in sports, such as a badminton racket, a tennis racket or a golf club. During usage of a sports device, the sports device may be tracked, in order to acquire a speed of the sports device in a moving state. The speed may be a speed of the sports device manipulated by the user.

Specifically, for a badminton racket or a tennis racket, the measured speed may be a speed of the user swinging the racket. For a golf club, the measured speed may be a speed of the user swinging the golf club.

The sports device may be provided with a sensor configured to collect movement data for calculation of the speed of the sports device.

At step 130, a linear speed and a tangential speed of rotational movement of the sports device are calculated based on accelerations of three axes in the movement data.

The movement data contains acceleration on three axes. During the process of tracking the sports device, after movement data corresponding to the sports device is acquired, a linear speed and a tangential speed of the rotational movement of the sports device may be calculated based on the accelerations of the three axes in the movement data.

In the embodiment, the linear speed refers to a speed of a linear movement in the movement of the sports device, and the tangential speed of the rotational movement refers to a speed of the rotational movement in the movement of the sports device. The movement of the sports device may be divided into a linear movement and the rotational movement. By calculating a linear speed and a tangential speed of the rotational movement, the speed of the sports device can be calculated more accurately, improving the accuracy in tracking the sports device.

At step 150, the linear speed and the tangential speed of the rotational movement are combined to obtain a movement speed of the sports device.

The linear speed and the tangential speed of the rotational movement may be combined with respective preset weights, to obtain a measured speed during the current tracking of the sports device. In turn, the movement state of the usage of the sports device in sports can be displayed, by for example, outputting a current speed of swinging a racket or a golf club.

The combination of the linear speed and the tangential speed of the rotational movement may be implemented with the following formula:

$$v = nv1 + mvn$$

Where, v denotes a measured speed, v1 denotes a linear speed, vn denotes a tangential speed of the rotational movement, n and m respectively denote a weight, and n+m=1 three axes in the movement data.

It can be seen from the above, it can realize tracking of a sports device in speed, capturing change in the speed of the sports device, and accurately providing movements data of sports for the user. It can also improve the maneuverability of the sports device.

Figure 2:
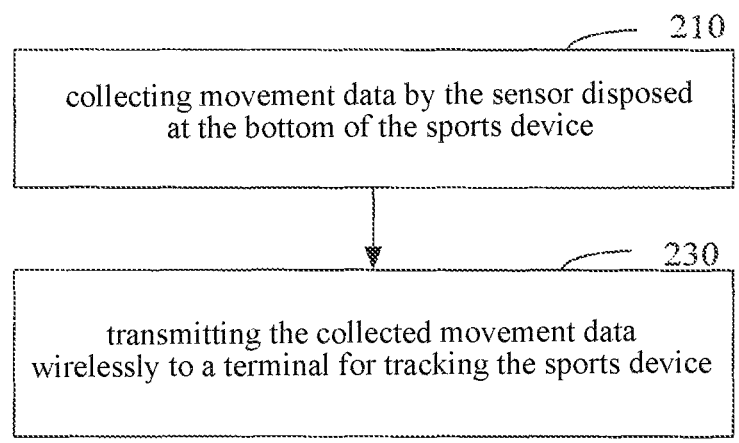
FIG. 2 is a flow chart illustrating a method for measuring a speed of a sports device according to another embodiment.

In one embodiment, as shown in FIG. 2, before the step 110, the method may also include the following steps.

At step 210, movement data is collected by the sensor disposed at the bottom of the sports device.

The sensor disposed at the bottom of the sports device may be an acceleration sensor or a three-axis acceleration sensor. The sensor may be configured depending on practical requirements on accuracy.

At step 230, the collected movement data is transmitted wirelessly to a terminal for tracking the sports device.

The terminal is configured to implement the measurement of the speed of the sports device. For example, the terminal may be a smart mobile phone, a tablet computer or other portable device.

After the movement data is collected by the sensor disposed at the bottom of the sports device, the collected movement data is transmitted wirelessly to the terminal, for the measurement of the speed of the sports device.

In other words, the sports device is provided at bottom thereof a tracking apparatus mainly composed of the sensor, which has a capability of wireless transmission. Correspondingly, the terminal for measurement of the speed of the sports device is adapted to the tracking apparatus, to implement the measurement of the speed of the sports device and in turn to monitor the change of speed in real time.

Figure 3:
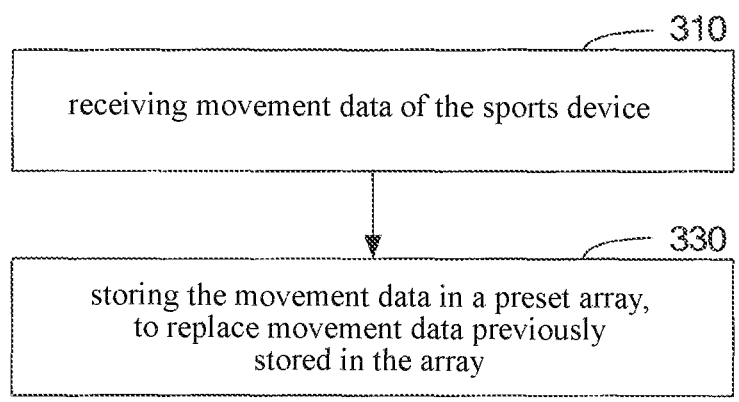
FIG. 3 is a flow chart illustrating a method for measuring a speed of a sports device according to another embodiment.

Further, in the embodiment, as shown in FIG. 3, after step 230, the method may also include the following steps.

At step 310, movement data of the sports device is received.

At step 330, the movement data is stored in a preset array, to replace movement data previously stored in the array.

After the terminal for tracking the sports device establishes a connection with the sports device, the terminal may receive the movement data and store the received movement data in the preset array, for subsequently calculating the speed.

The preset array is for storing the movement data, and the data in the array may be repeatedly replaced with movement data received at each time. In this way, it can save resources of the terminal which are occupied for measurement of the speed of the sports device, and can improve the processing efficient.

In one embodiment, before step 130, the above method may also include a step of filtering the movement data to remove noise in the movement data.

The movement data collected by the sensor generally contains noise. The calculation of the speed may be more effective after the movement data is filtered.

The filtering of the movement data may be moving-average filtering after the maximum and minimum values are removed. Here, the maximum and minimum values respectively refer to the maximum value and the minimum value of the movement data.

Further, in the terminal, the received movement data is stored in the preset array. The filtering is performed on the movement data stored in the array.

Specifically, the maximum value and the minimum value are searched out from the preset array and removed. Then, the remaining data in the movement data is processed with moving-average filtering.

In an optional embodiment, the preset array may store a preset number of data. For example, the array may store 5 pieces of movements data, and the stored data may be replaced if the array is full.

For example, in an embodiment, the movement data is collected at a period of for example 5 ms. Correspondingly, the receiving of the movement data is conducted at a period of 5 ms. The received movement data may be stored in the array, and the array may be replaced repeatedly.

In the array, the maximum value and the minimum value are searched out. The remaining 3 pieces of movement data are summed and averaged, to complete moving-averaging filtering with the maximum and minimum values removed. The calculation may be expressed by the following formula:

$$a = (a_0 + a_1 + a_2 + a_3 + a_4 - \max - \min)/3$$

Where, $a_0$, $a_1$, $a_2$, $a_3$ and $a_4$ are pieces of movement data stored in the array. Max is the maximum value of the movement data in the array, min is the minimum value of the movement data in the array, and a is the resulted movement data after the filtering.

Through the above process, the calculation with the movement data will not be affected by the noise, and the accuracy of the calculation can be improved.

In another embodiment, before step 130, the above method may also include a step of performing symmetrical processing on the movement data with respect to a linear movement, to obtain symmetrical movement data.

During an actual linear movement of the sports device, generally, the movement is started from stationary (the speed is 0) to moving (the speed is other than 0), and till stationary. Therefore, there is a maximum speed in the actual movement, and the movement data for calculation should be symmetrical to be consistent with the actual movement.

Specifically, in the acquired movement data, the acceleration related to linear movement is summed piece by piece respectively from two sides toward the middle, until a middle point is found out, the sums on the two sides of the middle point being equal. The middle point is taken as a mean value and the speed corresponding to the mean value is the maximum speed.

Through the above process, the mean value point related to the linear movement is identified, and the pre-processing of the received movement data is completed. At this time, the calculation of the speed related to the linear movement may be started.

Figure 4:
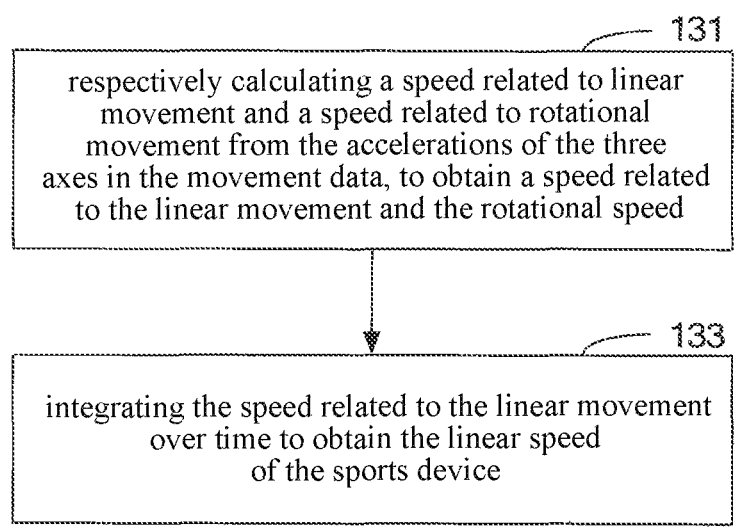
FIG. 4 is a flow chart illustrating a method for calculating a linear speed and a tangential speed of rotational movement of a sports device according to accelerations of three axes according to another embodiment as shown in FIG. 1.

In one embodiment, as shown in FIG. 4, step 130 may include the following steps.

At step 131, a speed related to linear movement and a speed related to rotational movement are respectively calculated from the accelerations of the three axes in the movement data, to obtain a speed related to the linear movement and the tangential speed of the rotational movement.

Since the movement data contains accelerations of the three axes, an acceleration related to linear movement and a centripetal acceleration may be obtained from the movement data, and thereby, the speed related to the linear movement and the tangential speed of the rotational movement may be calculated.

It should be particularly noted that, in the calculation of the measurement of the speed of the sports device, the reference of the accelerations of the three axes is a three-dimensional space constituted by the sensor. Therefore, the calculation related to the linear movement and the rotational movement will be conducted in this three-dimensional space. The three-dimensional space contains a X axis, a Y axis and a Z axis. The Z axis is parallel to the length direction of the racket (such as the racket direction of the badminton racket) of the sports device. The calculation related to the linear movement is conducted in the plane composed of the X axis and the Y axis. The tangential speed of the rotational movement is the speed corresponding to the Z axis.

Based on the calculation related to the linear movement and the rotational movement from the accelerations of the three axes in the movement data, the movement of the sports device may be accurately evaluated.

At step 133, the speed related to the linear movement is integrated over time to obtain the linear speed of the sports device.

After the speed related to the linear movement is calculated, the speed related to the linear movement is integrated over time. It can further avoid error and improve the reliability of the calculation.

During the integration, each time a separate movement is started, the integration of the speed is set to zero for the subsequent integration. Then, an error in the integration may be removed. Once it is detected that the sensor ceases operation, the integration is set to zero.

The movement of the sports device generally lasts a short time. For example, for the swing of the badminton racket, a single swing movement of racket may last less than 1s. Accordingly, each time the swing movement of the racket is completed, the integration is restarted, which is adapted to the movement of the badminton racket. In this way, it can ensure the accuracy of the measurement of the speed of the sports device.

Figure 5:
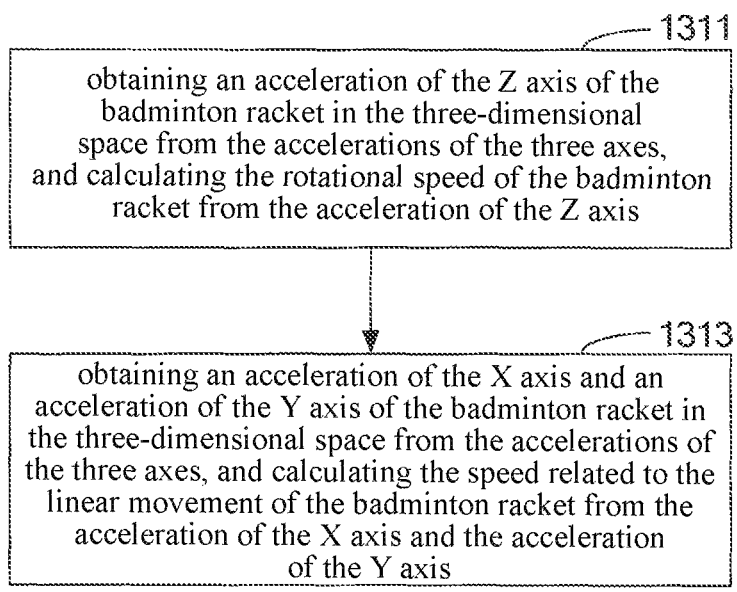
FIG. 5 is a flow chart illustrating a method for respectively calculating a speed related to a linear movement and a speed related to a rotational movement according to accelerations of three axes according to another embodiment as shown in FIG. 4, to obtain a speed related to the linear movement and a tangential speed of rotational movement.

Further, in the embodiment, for example, the sports device is a badminton racket, and as shown in FIG. 5, step 131 may include the following steps.

At step 1311, an acceleration of the Z axis of the badminton racket in the three-dimensional space is obtained from the accelerations of the three axes in the movement data, and the tangential speed of the rotational movement of the badminton racket is calculated from the acceleration of the Z axis.

The accelerations of the three axes are collected by the sensor disposed at the bottom of the sports device. For the sensor, if the Z axis in three-dimensional space corresponding to the accelerations of the three axes is not consistent with the length direction of the racket (such as the badminton racket), the coordinates should be converted to make the length direction of the racket to be the direction of the Z axis, in order to obtain accelerations based on the three-dimensional space. Then, the acceleration of the Z axis in the three-dimensional space may be obtained, that is the centripetal acceleration of the rotational movement.

A tangential speed of the rotational movement of the badminton racket may be calculated from the obtained centripetal acceleration of the rotational movement through the relation between the centripetal acceleration of the rotational movement and the tangential speed of the rotational movement as shown in the following formula:

$$a_n = \frac{v_n^2}{R}$$

Where $a_n$ is the centripetal acceleration pf the rotational movement, $v_n$ is the tangential speed of the rotational movement, and R is a radius of the rotational movement of the sensor.

In an optional embodiment, the accelerations of the three axes acquired by the sensor are consistent with the three-dimensional space of the sports device, and the centripetal acceleration of the rotational movement may be directly acquired from the movement data.

At step 1313, an acceleration of the X axis and an acceleration of the Y axis of the badminton racket in the three-dimensional space are obtained from the accelerations of the three axes in the movement data, and the speed related to the linear movement of the badminton racket is calculated from the acceleration of the X axis and the acceleration of the Y axis.

Similar to the rotational movement, in the calculation related to the linear movement, the acceleration of the X axis and the acceleration of the Y axis of the badminton racket in the three-dimensional space may be obtained either by conversion of coordinates or directly, for the calculation of the speed.

Specifically, calculation of the acceleration related to the linear movement may be conducted from the acceleration of the X axis and the acceleration of the Y axis, that is, $a = \sqrt{a_x^2 + a_y^2}$, where, $a_x$ is acceleration of the X axis and $a_y$ is the acceleration of the Y axis.

For the swing of the badminton racket, the linear movement is mainly decided by the acceleration of the X axis and the acceleration of the Y axis. Therefore, the acceleration of the Z axis may be neglected. In this way, the calculation can be simplified to reduce the complexity of the calculation while the accuracy of the calculation can be ensured.

In addition, the rotational movement is mainly decided by the acceleration of the Z axis, and the linear movement of the Z axis may be neglected.

It should be noted that, the step 1311 of the calculation related to the linear movement and the step 1313 of the calculation related to the rotational movement may be performed either simultaneously or successively, which is not limited herein.

Through the above process, the measurement of the speed of a sports device such as a badminton racket, a tennis racket or a golf club can be realized, and it allows accurate indication of speed of the swinging of the racket or golf club.

Through the above process, the speed of the sports device can be conveniently and simply measured. It can present sports parameters during the process of the user swinging the racket or the golf club and enhance the performance of the sports device without significantly increasing the cost.

Compared with the existing speed measurement method such as a stopwatch, the method of measurement in the present disclosure will not be significantly affected by human factors and simple to operate. Compared with the existing speed measurement method such as gyroscope, the method of measurement in the present disclosure will not be limited by a high cost or a measurement range. Through the above described process, the speed of the sports device can be accurately measured.

Figure 6:
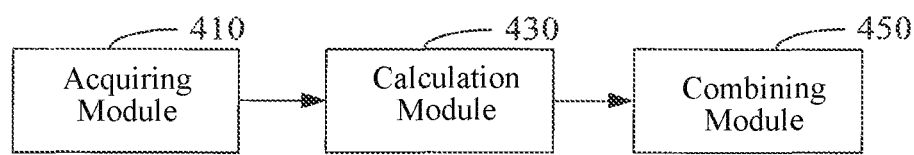
FIG. 6 is a block diagram illustrating an apparatus for measuring a speed of a sports device according to an embodiment.

In one embodiment, there is correspondingly provided an apparatus for measuring a speed of a sports device. As shown in FIG. 6, the apparatus includes an acquiring module 410, calculation module 430 and combining module 450.

The acquiring module 410 is configured to acquire movement data of the sports device during a process of tracking the sports device, the movement data being collected by a sensor disposed at a bottom of the sports device.

The calculation module 430 is configured to calculate a linear speed and a tangential speed of the rotational movement of the sports device based on accelerations of three axes in the movement data.

The combining module 450 is configured to combine the linear speed and the tangential speed of the rotational movement to obtain a movement speed of the sports device.

Figure 7:
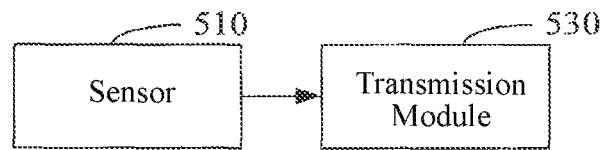
FIG. 7 is a block diagram illustrating an apparatus for measuring a speed of a sports device according to another embodiment.

In one embodiment, as shown in FIG. 7, the above apparatus also includes a sensor 510 and a transmission module 530.

The sensor 510 is disposed at the bottom of the sports device and configured to collect movement data.

The transmission module 530 is configured to transmit the collected movement data wirelessly to a terminal for tracking the sports device.

Figure 11:
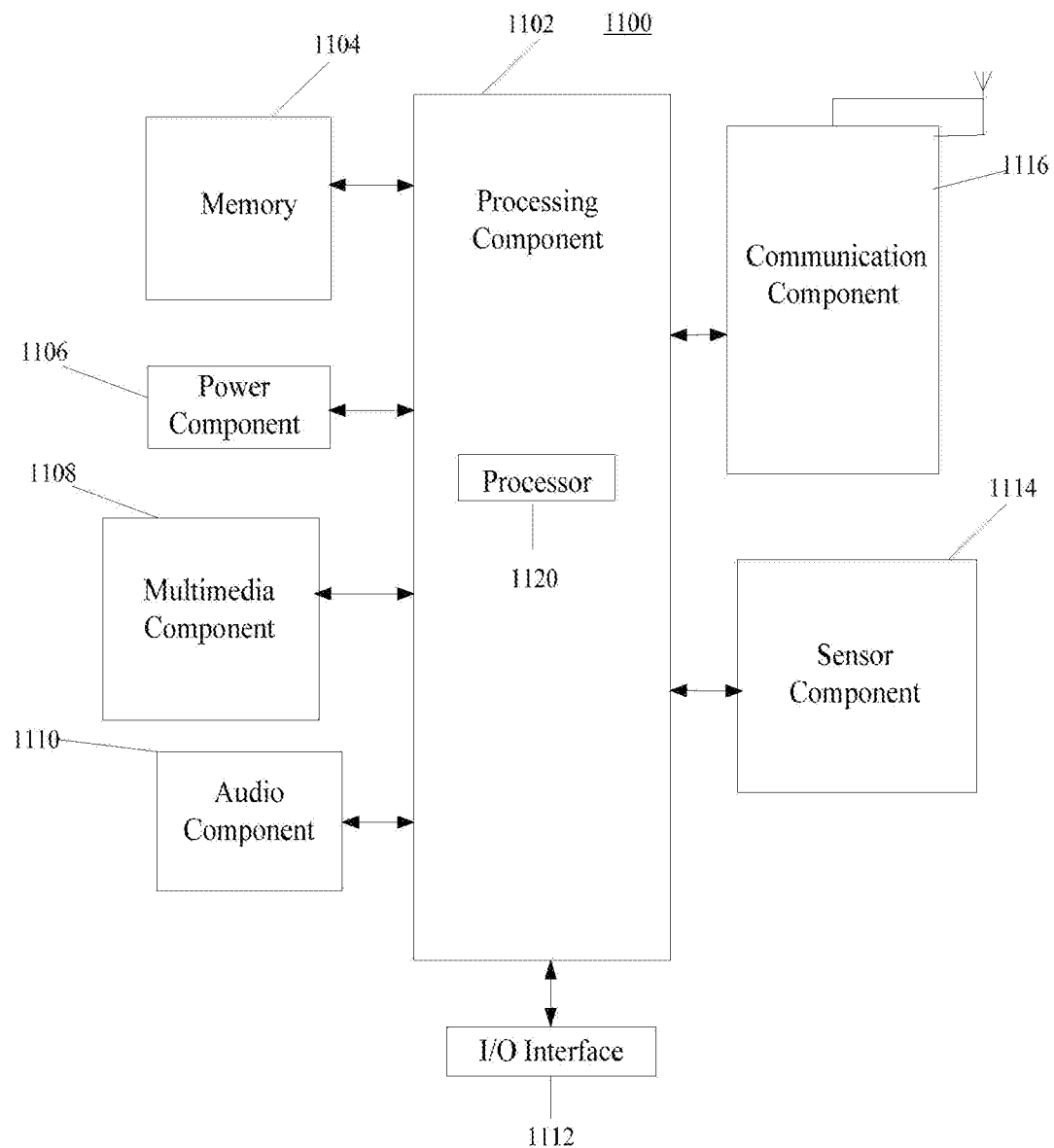
FIG. 11 is a block diagram of a system for measuring a speed of a sports device according to an exemplary embodiment.

FIG. 11 is a block diagram of a system 1100 for measuring a speed of a sports device according to an exemplary embodiment. Referring to FIG. 11, the system 1100 may include one or more of the following components: a processing component 1102, a memory 1104, a power component 1106, a multimedia component 1108, an audio component 1110, an input/output (I/O) interface 1112, a sensor component 1114 and a communication component 1116.

The processing component 1102 typically controls overall operations of the system 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the system 1100. Examples of such data include instructions for any applications or methods operated on the system 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the system 1100. The power component 1106 may include a power management system, one or more power sources, and any other components associated with the generation, management, and distribution of power in the system 1100.

The multimedia component 1108 includes a screen providing an output interface between the system 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the system 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the system 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 may be disposed at the bottom of the sports device. The sensor component 1114 may collect movement data, particularly accelerations in three axes of the sports device. The sensor component 1114 may send the collected movement data to the processor wirelessly. For example, the sensor component 1114 may also include an accelerometer sensor, a gyroscope sensor.

The communication component 1116 is configured to facilitate communication, wired or wirelessly, between the system 1100 and other devices. The system 1100 can access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the system 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for measuring a speed of a sports device. The details of the methods may refer to the above embodiments, and will not be repeated herein.

In exemplary embodiments, there is also provided a non-transitory computer-readable storage medium including instructions, such as included in the memory 1104, executable by the processor 1120 in the system 1100, for performing the above-described methods for measuring a speed of a sports device. For example, the non-transitory computer-readable storage medium may be a ROM, a RAM, a CD-ROM, a magnetic tape, a floppy disc, an optical data storage device, and the like.

Figure 8:
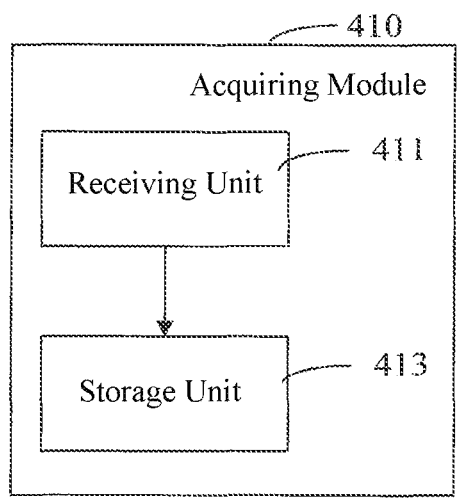
FIG. 8 is a block diagram illustrating an acquiring module in FIG. 6.

In one embodiment, as shown in FIG. 8, the acquiring module 410 includes a receiving unit 411 and a storage unit 413.

The receiving unit 411 is configured to receive movement data of the sports device.

The storage unit 413 is configured to store the movement data in a preset array, to replace movement data previously stored in the array In one embodiment, the apparatus further includes: a filtering module. The filtering module is configured to filter the movement data to remove noise in the movement data.

Figure 9:
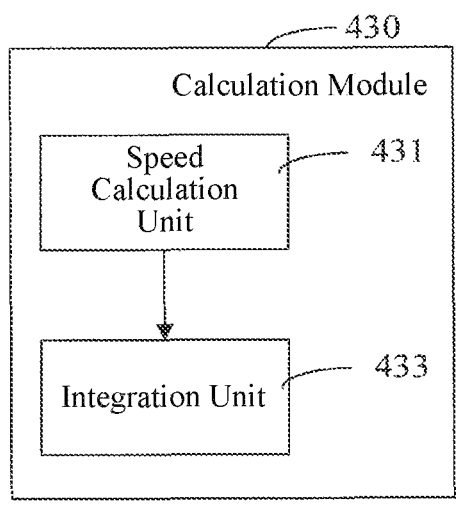
FIG. 9 is a block diagram illustrating a calculation module in FIG. 6.

In one embodiment, as shown in FIG. 9, the calculation module 430 includes: a speed calculation unit 431 and an integration unit 433.

The speed calculation unit 431 is configured to respectively calculate a speed related to linear movement and a speed related to rotational movement from the accelerations of the three axes in the movement data, to obtain a speed related to the linear movement and the tangential speed of the rotational movement The integration unit 433 is configured to integrate the speed related to the linear movement over time to obtain the linear speed of the sports device.

Figure 10:
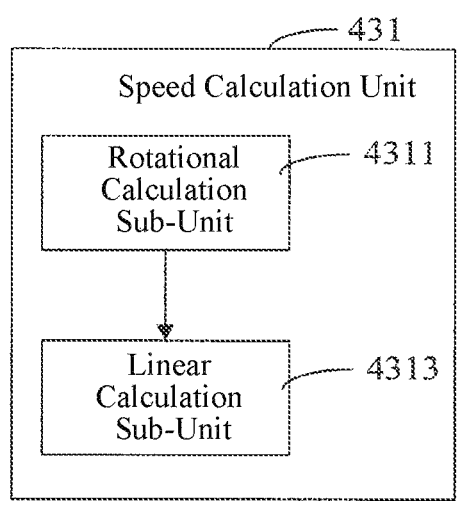
FIG. 10 is a block diagram illustrating a speed calculation unit in FIG. 9.

Further, in the embodiment, the sports device may be a badminton racket, and as shown in FIG. 10, the speed calculation unit 431 includes: a rotational calculation sub-unit 4311 and a linear calculation sub-unit 4313.

The rotational calculation sub-unit 4311 is configured to obtain an acceleration of a Z axis of the badminton racket in a three-dimensional space from the accelerations of the three axes in the movement data, and calculate the tangential speed of the rotational movement of the badminton racket from the acceleration of the Z axis.

The linear calculation sub-unit 4313 is configured to obtain an acceleration of a X axis and an acceleration of a Y axis of the badminton racket in the three-dimensional space from the accelerations of the three axes in the movement data, and calculate the speed related to the linear movement of the badminton racket from the acceleration of the X axis and the acceleration of the Y axis.

It can be understood by those skilled in the related art that part of or all of the steps in the above embodiments can be implemented by hardware, or by relevant hardware instructed by programs. The programs may be stored in a computer readable storage medium which may be a read-only memory, a magnetic disc or an optical disk, etc.

Although the present disclosure has been described with reference to exemplary embodiments, it should be understood that the terms used herein are merely illustrative and exemplary, rather than limiting. Since the present disclosure may be specifically embodied in various forms without departing the spirit or essence of the present disclosure, it should be understood that the above embodiments are not limited to any the above described details, but should be interpreted broadly within the spirit and scope defined by the appended claims. Therefore, all the modifications and alterations falling within the claims and their equivalents should be covered by the appended claims.

What is claimed is:

1. A method for measuring a speed of a sports device, comprising:
   acquiring, by a sensor disposed at a bottom of the sports device, movement data of the sports device during a process of tracking the sports device;
   transmitting the movement data wirelessly to a terminal;
   calculating, by the terminal, a linear speed and a tangential speed of rotational movement of the sports device based on accelerations of three axes in the movement data; and
   combining, by the terminal, the linear speed and the tangential speed of the rotational movement to obtain a movement speed of the sports device,
   wherein the accelerations of three axes comprises an acceleration of Z axis, an acceleration of X axis, and an acceleration of Y axis, and the Z axis is parallel to a length direction of the sports device, and the X axis and the Y axis are perpendicular to the Z axis,
   wherein the linear speed is obtained from the acceleration of X axis and the acceleration of Y axis, and the tangential speed of the rotational movement is obtained from the acceleration of Z axis, and
   wherein the linear speed and the tangential speed of the rotational movement is combined to obtain the movement speed of the sports device by:

$$v = nv_1 + mv_n$$

where v denotes the movement speed of the sports device, $V_1$ denotes the linear speed, $V_n$ denotes the tangential speed of the rotational movement, n and m respectively denote a weight, and n+m=1.

2. The method of claim 1, wherein before the step of calculating a linear speed and a tangential speed of rotational movement of the sports device based on accelerations of three axes in the movement data, the method further comprises: filtering, by the terminal, the movement data to remove noise in the movement data.

3. A system for measuring a speed of a sports device, comprising:
   a sensor disposed at a bottom of the sports device, and
   a terminal, comprising a processor, and a memory for storing instructions executable by the processor,
   wherein the processor is configured to carry out:
   acquiring, by the sensor, movement data of the sports device during a process of tracking the sports device;
   transmitting the movement data wirelessly to the terminal;
   calculating, by the terminal, a linear speed and a tangential speed of rotational movement of the sports device based on accelerations of three axes in the movement data; and combining, by the terminal, the linear speed and the tangential speed of the rotational movement to obtain a movement speed of the sports device, wherein the accelerations of three axes comprises an acceleration of Z axis, an acceleration of X axis, and an acceleration of Y axis, and the Z axis is parallel to a length direction of the sports device, and the X axis and the Y axis are perpendicular to the Z axis, wherein the linear speed is obtained from the acceleration of X axis and the acceleration of Y axis, and the tangential speed of the rotational movement is obtained from the acceleration of Z axis, and wherein the linear speed and the tangential speed of the rotational movement is combined to obtain the movement speed of the sports device by:

$$v = nv_1 + mv_n$$

where v denotes the movement speed of the sports device, $V_1$ denotes the linear speed, $V_n$ denotes the tangential speed of the rotational movement, n and m respectively denote a weight, and n+m=1.

4. The system of claim 3, wherein before the step of calculating a linear speed and a tangential speed of rotational movement of the sports device based on accelerations of three axes in the movement data, the processor is further configured to carry out:

filtering, the terminal, the movement data to remove noise in the movement data.

5. A non-transitory computer-readable storage medium storing instructions, executable by a processor in a terminal, for performing a method for measuring a speed of a sports device, the method comprises:

acquiring, by a sensor disposed at a bottom of the sports device, movement data of the sports device during a process of tracking the sports device;

transmitting the movement data wirelessly to the terminal calculating, by the terminal, a linear speed and a tangential speed of rotational movement of the sports device based on accelerations of three axes in the movement data; and combining, by the terminal, the linear speed and the tangential speed of the rotational movement to obtain a movement speed of the sports device, wherein the accelerations of three axes comprises an acceleration of Z axis, an acceleration of X axis, and an acceleration of Y axis, and the Z axis is parallel to a length direction of the sports device, and the X axis and the Y axis are perpendicular to the Z axis, wherein the linear speed is obtained from the acceleration of X axis and the acceleration of Y axis, and the tangential speed of the rotational movement is obtained from the acceleration of Z axis, and wherein the linear speed and the tangential speed of the rotational movement is combined to obtain the movement speed of the sports device by:

$$v = nv_1 + mv_n$$

where v denotes the movement speed of the sports device, $V_1$ denotes the linear speed, $V_n$ denotes the tangential speed of the rotational movement, n and m respectively denote a weight, and n+m=1.

6. The non-transitory computer-readable storage medium of claim 5, wherein before the step of calculating a linear speed and a tangential speed of rotational movement of the sports device based on accelerations of three axes in the movement data, the method further comprises:

filtering, the terminal, the movement data to remove noise in the movement data.

* * * * *